(12) United States Patent
Wheatley et al.

(10) Patent No.: US 12,268,183 B2
(45) Date of Patent: Apr. 8, 2025

(54) FREE ACCESS SOW GESTATION STALL GATE ASSEMBLY

(71) Applicant: CTB, Inc., Milford, IN (US)

(72) Inventors: Jacob Wheatley, Elkhart, IN (US); Christopher Elvidge, Albion, IN (US)

(73) Assignee: CTB, Inc., Milford, IN (US)

( * ) Notice: Subject to any disclaimer, the term of this patent is extended or adjusted under 35 U.S.C. 154(b) by 189 days.

(21) Appl. No.: 17/892,502

(22) Filed: Aug. 22, 2022

(65) Prior Publication Data

US 2023/0059604 A1    Feb. 23, 2023

Related U.S. Application Data

(60) Provisional application No. 63/236,016, filed on Aug. 23, 2021.

(51) Int. Cl.
*A01K 1/00* (2006.01)
*A01K 1/02* (2006.01)

(52) U.S. Cl.
CPC .......... *A01K 1/0017* (2013.01); *A01K 1/0218* (2013.01)

(58) Field of Classification Search
CPC .. A01K 1/0218; A01K 1/0011; A01K 1/0017; A01K 1/0023
USPC ............................................................ 49/46
See application file for complete search history.

(56) References Cited

U.S. PATENT DOCUMENTS

| | | | | |
|---|---|---|---|---|
| 69,022 A | * | 9/1867 | Putnam | A01K 1/0017 119/524 |
| 1,390,725 A | * | 9/1921 | Ruth | E06B 5/00 49/54 |
| 3,229,666 A | * | 1/1966 | Sedevie | A01K 1/0017 119/734 |
| 6,370,823 B1 | * | 4/2002 | Andersen | A01K 1/0017 49/57 |

(Continued)

FOREIGN PATENT DOCUMENTS

| | | | |
|---|---|---|---|
| DE | 29808665 U1 * | 8/1998 | ........... A01K 1/0017 |
| EP | 2005820 A2 | 12/2008 | |

(Continued)

OTHER PUBLICATIONS

Translation of EP2005820A2 (Year: 2007).*

(Continued)

*Primary Examiner* — Peter M Poon
*Assistant Examiner* — Shada Mohamed Alghailani
(74) *Attorney, Agent, or Firm* — Harness, Dickey & Pierce, P.L.C.

(57) ABSTRACT

A gestation stall gate assembly includes a gate support, a gate pivotably coupled to the gate support, and a gate control assembly. The gate is pivotable between an inwardly open position, a closed position, and an outwardly open position. The gate control assembly is configured to (i) allow the gate to pivot from the closed position to the inwardly open position when a sow pushes against the gate to pivot the gate toward the inwardly open position, (ii) prevent the gate from pivoting from the closed position to the inwardly open position for a second time until the gate is pivoted from the closed position to the outwardly open position, and (iii) allow the gate to pivot from the closed position to the outwardly open position when the sow pushes against the gate to pivot the gate toward the outwardly open position.

28 Claims, 13 Drawing Sheets

(56) References Cited

U.S. PATENT DOCUMENTS

2009/0173285 A1\* 7/2009 Rasmussen .......... A01K 1/0017
119/502
2010/0236495 A1\* 9/2010 Kleinsasser .......... A01K 1/0017
119/524

FOREIGN PATENT DOCUMENTS

| EP | 2474223 A1 | 7/2012 |
|----|------------|--------|
| NL | 1007632 C1 | 5/1999 |

OTHER PUBLICATIONS

Translation of NL 1007632 C1 (Year: 1999).\*
International Search Report and Written Opinion regarding International Patent Application No. PCT/US2022/041144, dated Jan. 5, 2023.
Office Action issued in CA3170992, mailed Oct. 26, 2023.
Echo Liberté. Galvelpor. Retrieved Aug. 3, 2021, from https://www.galvelpor.com/fr/echo-liberte.html; 7 pages (including translation).

\* cited by examiner

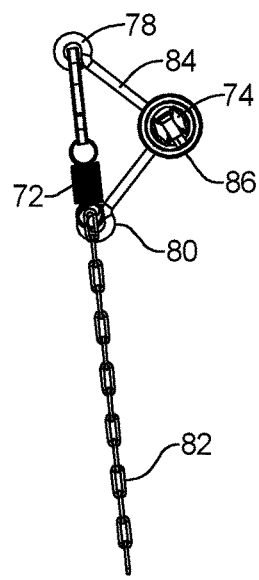
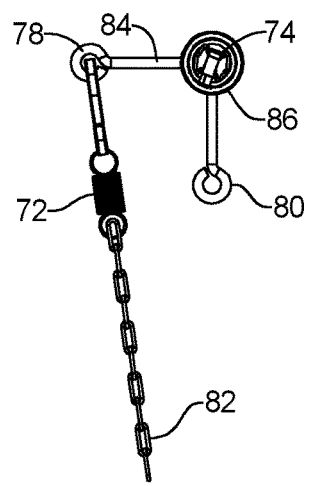
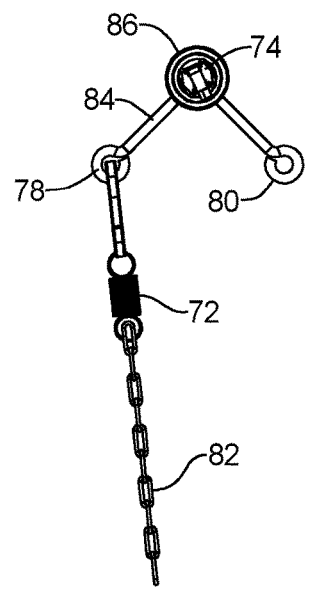
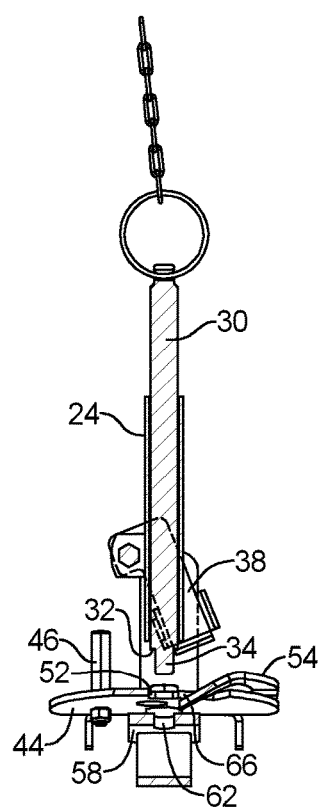
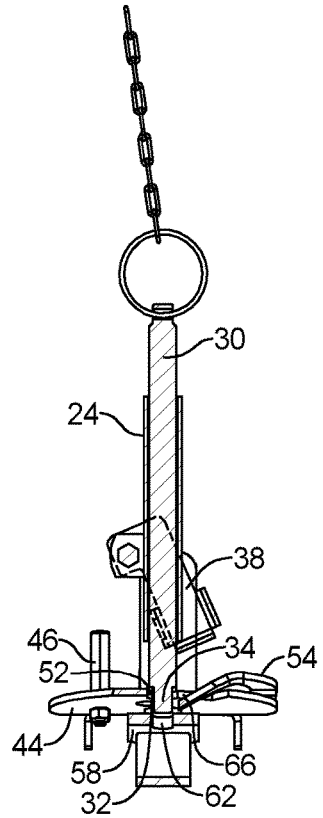
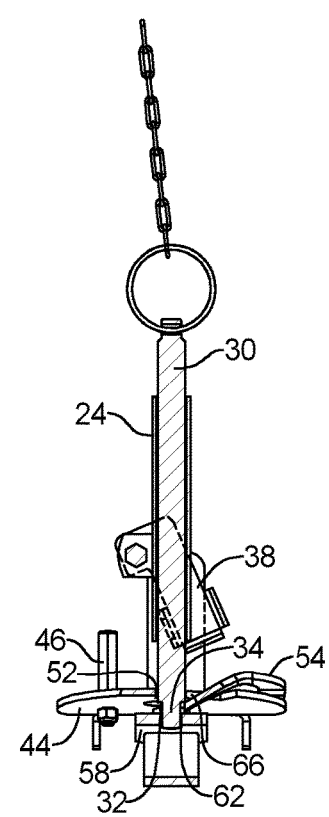
FIG. 4 FIG. 5 FIG. 6

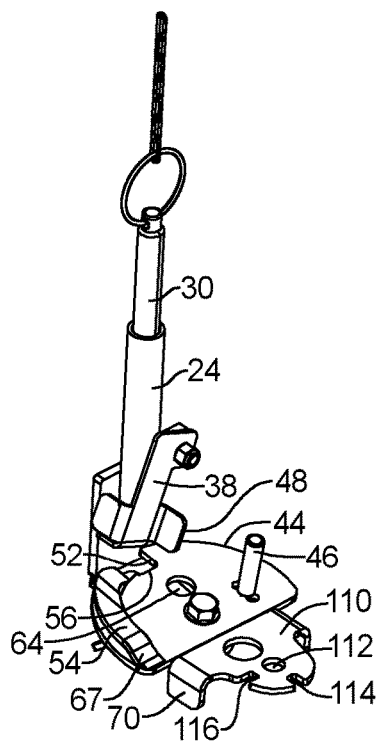
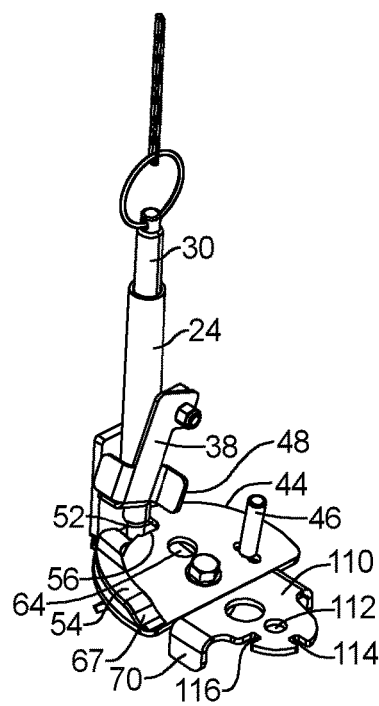
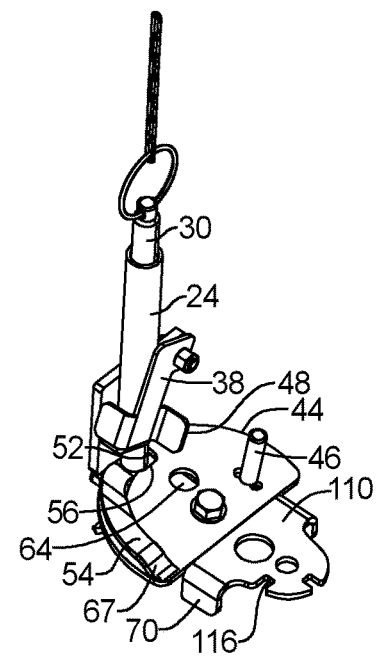
FIG. 7　　　　FIG. 8　　　　FIG. 9
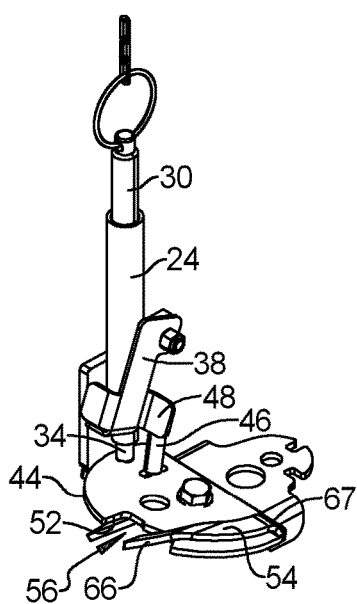
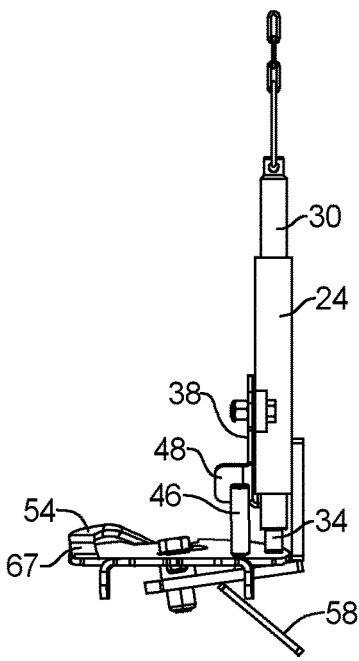
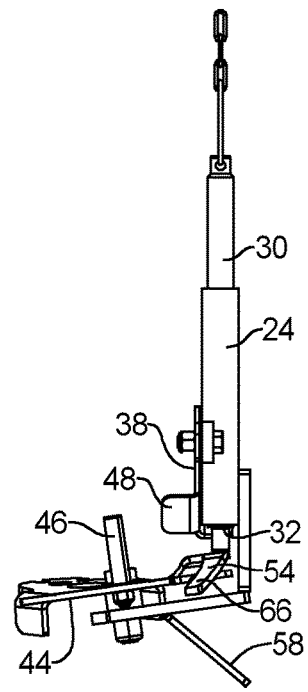
FIG. 10　　　　FIG. 11　　　　FIG. 12

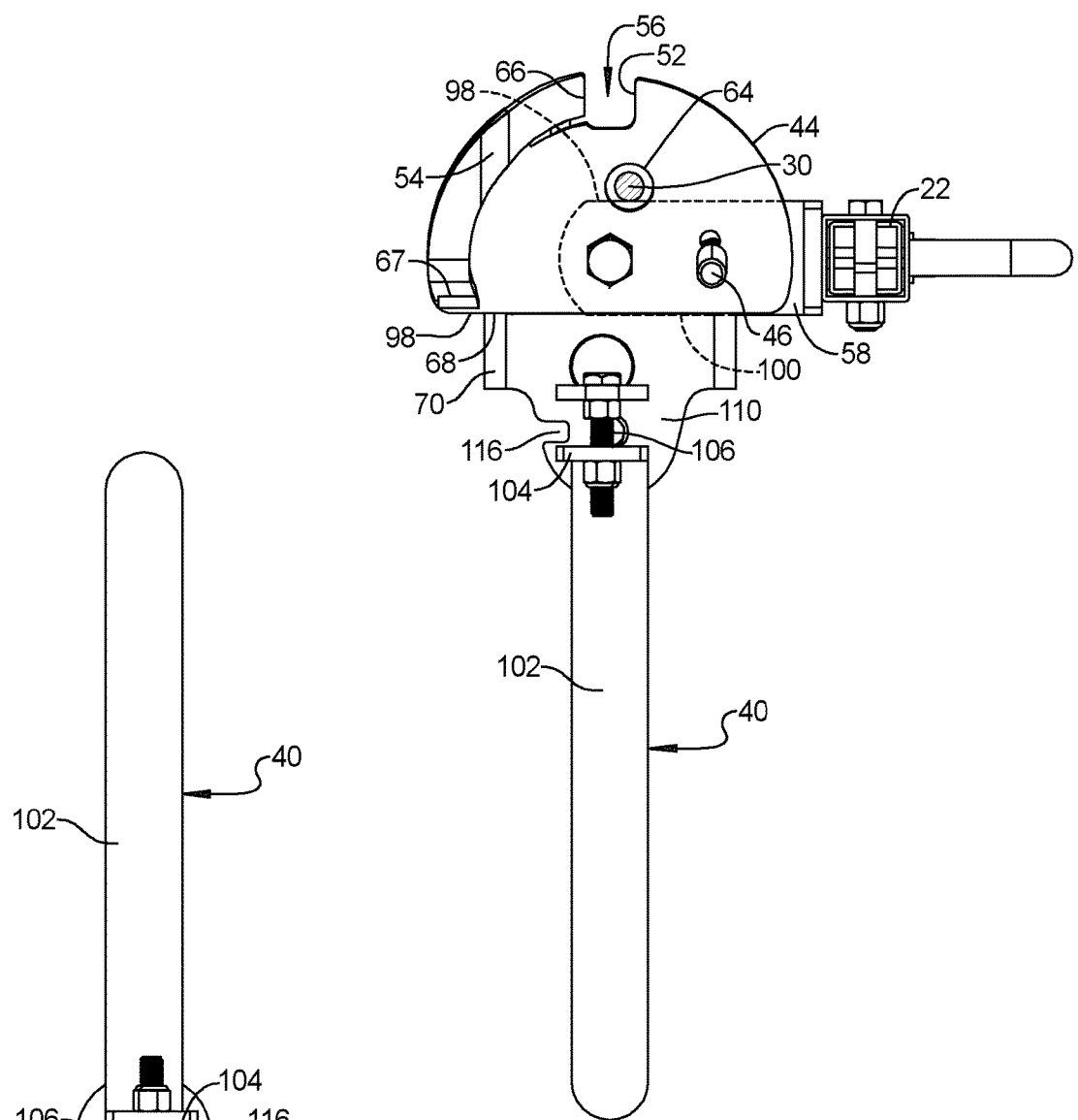
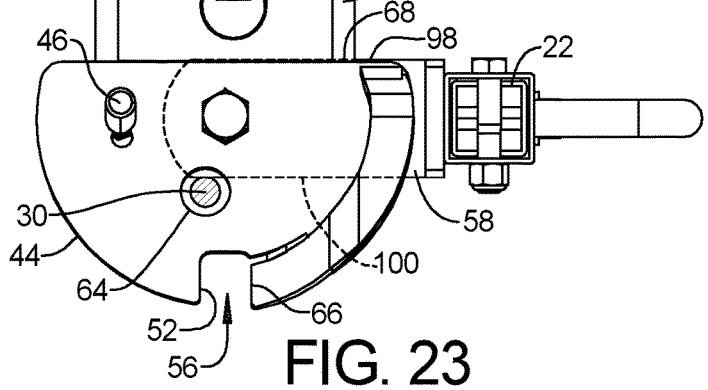
FIG. 24
FIG. 23

FREE ACCESS SOW GESTATION STALL GATE ASSEMBLY

CROSS-REFERENCE TO RELATED APPLICATIONS

This application claims the benefit of U.S. Provisional Application No. 63/236,016, filed on Aug. 23, 2021. The entire disclosure of the above application is incorporated herein by reference.

FIELD

The present disclosure relates to a free access sow gestation stall gate assembly, and a gestation stall including same.

BACKGROUND

This section provides background information related to the present disclosure which is not necessarily prior art.

Generally, free access sow gestation stalls are typically designed to allow a sow to freely enter an empty stall. While a sow occupies the stall, the stall can prevent another sow from entering the same stall. Free access sow gestation stalls can also allow the sow in the stall to freely exit the stall when desired.

Known free access sow gestation stall gate assemblies typically include an overhead door that pivots up and down along a horizontal axis to open and close the stall gate. This means the gates typically extend into and over the aisles between the gates when open, which is the default state. This can limit accessible space in the aisle. Known free access sow gestation stall gate assemblies also typically include a closing or entering actuator or surface at the front of the stall that the sow engages against upon entry to close the gate behind it. In addition, such gate assemblies typically include an opening or back-out actuator or surface at the rear of the stall that the sow's rump directly engages against to open the gate. This means the gate assembly typically spans from the front of the stall to the back of the stall, which can introduce complexity and increase maintenance, material, and manufacturing costs. The mechanisms that open and close the gate can be fully mechanical, or can include electronic or pneumatic components.

SUMMARY

This section provides a general summary of the disclosure, and is not a comprehensive disclosure of its full scope or all of its features.

An example of a gestation stall gate assembly according to the present disclosure includes a gate, a gate support, and a gate control assembly. The gate is coupled to the gate support in a way that enables the gate to pivot around a pivot axis between an inwardly open gate position, a closed gate position, and an outwardly open gate position. The gate control assembly is configured to (i) allow the gate to pivot from the closed gate position to the inwardly open gate position when a sow pushes against the gate to pivot the gate toward the inwardly open gate position, (ii) prevent the gate from pivoting from the closed gate position to the inwardly open gate position for a second time until the gate is pivoted from the closed gate position to the outwardly open gate position, and (iii) allow the gate to pivot from the closed gate position to the outwardly open gate position when the sow pushes against the gate to pivot the gate toward the outwardly open gate position.

In one aspect, the force of the sow pushing against the gate alone is sufficient to pivot the gate from the closed gate position to the inwardly open gate position and from the closed gate position to the outwardly open gate position.

In one aspect, the gate control assembly is free of any electronic or pneumatic components.

In one aspect, the force of gravity biases the gate toward the closed gate position.

In one aspect, the pivot axis extends essentially vertically.

In one aspect, the gestation stall gate assembly is configured to be disposed at only one end of a stall.

In one aspect, the gate support includes a sleeve, and the gate control assembly includes a locking bare, a latch, and a rotating control bracket. The locking bar is slidably mounted in the sleeve of the gate support. The latch is pivotably coupled to the gate support and biased into engagement with the locking bar to stop downward movement of the locking bar. The rotating control bracket is coupled to the gate for rotation therewith. As the gate pivots toward the inwardly open gate position, the rotating control bracket disengages the latch from the locking bar, which allows the locking bar to move downward to the rotating control bracket and prevent the gate from pivoting to the inwardly open gate position again. As the gate pivots toward the outwardly open gate position, the rotating control bracket raises the locking bar to enable the latch to reengage the locking bar.

In one aspect, the locking bar has an upper end, a lower end, and a latching surface positioned between the upper and lower ends. The latch is biased toward a latched position in which the latch engages the latching surface of the locking bar to prevent the locking bar from moving downward. The rotating control bracket has a rotating recess and an unlatching surface. As the gate pivots toward the inwardly open gate position, the unlatching surface of the rotating control bracket engages the latch and thereby moves the latch from the latched position to an unlatched position in which the locking bar is allowed to move downwardly into the rotating recess of the rotating control bracket.

In one aspect, the rotating control bracket has a non-entry surface positioned on one side of the rotating recess. When an attempt is made to pivot the gate from the closed gate position to the inwardly open gate position while the locking bar is positioned within the rotating recess, the lower end of the locking bar engages the non-entry surface of the rotating recess to prevent the gate from rotating to the inwardly open gate position.

In one aspect, the rotating control bracket has a bar reset cam surface positioned on another side of the rotating recess opposite of the non-entry surface. When the gate is pivoted from the closed gate position to the outwardly open gate position while the locking bar is positioned within the rotating recess, the lower end of the locking bar engages the bar reset cam surface and slides along the bar reset cam surface, which raises the latching surface of the locking bar to a latching height at which the latch reengages the latching surface.

In one aspect, the gate control assembly further includes a control rod and a line. The control rod is coupled to the gate support and rotatable about a central longitudinal axis of the control rod. The control rod includes a first coupling positioned radially outward from the central longitudinal axis. The line couples the locking bar to the control rod to limit downward movement of the locking bar.

In one aspect, the gate control assembly further includes a spring that allows temporary extension of the length of the line.

In one aspect, the gate control assembly further includes a control arm and an arm bracket through which the control arm extends. The control arm is coupled to the control rod and is moveable to rotate the control rod about the central longitudinal axis thereof. The arm bracket has a plurality of recesses for receiving and retaining the control arm in one of a plurality of positions to adjust the height of the first coupling.

In one aspect, the plurality of recesses include a middle position recess, an upper position recess, and a lower position recess, The middle position recess corresponds to the first coupling being positioned at a middle height. The upper position recess corresponds to the first coupling being positioned at an upper height that is higher than the middle height. The lower position recess corresponds to the first coupling being positioned at a lower height that is lower than the middle height.

In one aspect, when the control arm is positioned in the middle position recess, the gate control assembly prevents pivoting of the gate from the closed gate position to the inwardly open gate position more than one time without pivoting the gate from the closed gate position to the outwardly open gate position. When the control arm is positioned in the upper position recess, the gate control assembly allows the gate to pivot from the closed gate position to the inwardly open gate position more than one time regardless of whether the gate is pivoted from the closed gate position to the outwardly open gate position. When the control arm is positioned in the lower position recess and the gate returns to the closed gate position after pivoting to the inwardly open gate position, the gate control assembly locks the gate in the closed gate position.

In one aspect, when the control arm is positioned in the middle position recess and the gate returns to the closed gate position from the inwardly open gate position, the line positions the lower end of the locking bar within the rotating recess of the rotating control bracket.

In one aspect, when the control arm is positioned in the upper position recess and the gate returns to the closed gate position from the inwardly open gate position, the line supports the lower end of the locking bar in a position above the rotating recess of the rotating control bracket.

In one aspect, the gate control assembly further includes a non-rotating control bracket fixed to the gate support and having a non-rotating recess. When the control arm is positioned in the lower position recess and the gate returns to the closed gate position from the inwardly open gate position, the line permits the lower end of the locking bar to move downwardly through the rotating recess of the rotating control bracket and into the non-rotating recess of the non-rotating control bracket.

In one aspect, the gate control assembly further includes a second coupling coupled to the control rod and positioned at a height that is lower than the height of the first coupling when the control arm is positioned in either one of the middle and upper position recesses. When the gate is in the closed gate position and the latch is moved from the latched position to the unlatched position after the line is uncoupled from the first coupling and coupled to the second coupling, the line permits the lower end of the locking bar to move downwardly through the rotating recess of the rotating control bracket and into the non-rotating recess of the non-rotating control bracket and thereby locks the gate in the closed gate position.

In one aspect, the rotating control bracket includes a first downwardly extending tab, and the rotating control bracket has an open locking recess. When the locking bar is placed in the open locking recess while the gate is in the inwardly open gate position, the locking bar and the first downwardly extending tab of the rotating control bracket engage outward and inward edges of the non-rotating control bracket, respectively, to lock the gate in the inwardly open gate position.

In one aspect, the rotating control bracket includes a second downwardly extending tab. When the locking bar is placed in the open locking recess while the gate is in the outwardly open gate position, the locking bar and the second downwardly extending tab of the rotating control bracket engage the inward and outward edges of the non-rotating control bracket, respectively, to lock the gate in the inwardly open gate position.

In one aspect, the gate includes a lower section and an upper section that is moveable between a closed section position and an open section position while the lower section of the gate remains in the closed gate position.

In one aspect, the gate further includes a section locking tab that is movable between a section locked position and a section unlocked position. When the section locking tab is in the section locked position, the section locking tab locks the upper section of the gate in the closed section position. When the section locking tab is in the section unlocked position, the section locking tab permits the upper section of the gate to move from the closed section position to the open section position.

In one aspect, the gate further includes a section bracket and a section positioning protrusion. The section bracket includes a pivot recess, a closed section positioning recess, and an open section positioning recess. The section positioning protrusion is receivable in either one of the closed section positioning recess and the open section positioning recess. The upper section of the gate includes an upper pivot shaft that is supported in the pivot recess of the section bracket. Moving the section locking tab to the section unlocked position while the upper section of the gate is in the closed section position enables the upper section to be raised upward to remove the section positioning protrusion from the closed section positioning recess of the section bracket. Rotating the upper section of the gate from the closed section position to the open section position enables the section positioning protrusion to be received in the open section positioning recess, which holds the upper section in the open section position.

Another example of a gestation stall gate assembly according to the present disclosure includes a gate, a gate support, a locking bar, a latch, and a rotating control bracket. The gate support includes a sleeve. The gate is coupled to the gate support and is pivotable between an inwardly open gate position, an outwardly open gate position, and a closed gate position. The locking bar has an upper end, a lower end, and a latching surface positioned between the upper and lower ends. The latch is pivotably coupled to the gate support and is biased into engagement with the latching surface of the locking bar to stop downward movement of the locking bar through the sleeve. The rotating control bracket is coupled to the gate for rotation therewith. The rotating control bracket has a bar reset cam surface and an unlatching surface. As the gate pivots toward the inwardly open gate position, the unlatching surface of the rotating control bracket is engageable with the latch to disengage the latch from the locking bar. As the gate pivots toward the outwardly open gate position, the lower end of the locking bar is engageable with the bar reset cam surface and slidable along the bar reset cam surface to raise the latching surface of the locking bar to a latching height at which the latch is engageable with the latching surface to stop downward movement of the locking bar through the sleeve.

In one aspect, the latch is biased toward a latched position in which the latch engages the latching surface of the locking bar to prevent the locking bar from moving downward, and the rotating control bracket has a rotating recess. As the gate pivots toward the inwardly open gate position, the unlatching surface of the rotating control bracket engages the latch and thereby moves the latch from the latched position to an unlatched position in which the locking bar is allowed to move downwardly into the rotating recess of the rotating control bracket.

In one aspect, the gestation stall gate assembly further includes a control rod and a line. The control rod is coupled to the gate support and is rotatable about a central longitudinal axis of the control rod. The control rod includes a coupling positioned radially outward from the central longitudinal axis. The line couples the locking bar to the control rod to limit downward movement of the locking bar.

In one aspect, the gestation stall gate assembly further includes a control arm and an arm bracket coupled to the gate support. The control arm is coupled to the control rod and is moveable to rotate the control rod about the central longitudinal axis thereof. The arm bracket has a plurality of recesses for receiving and retaining the control arm in one of a plurality of positions to adjust the height of the coupling.

In one aspect, the gate support further includes a non-rotating control bracket having a non-rotating recess. When the control arm is positioned in one of the plurality of recesses and the gate returns to the closed gate position from the inwardly open gate position, the line permits the lower end of the locking bar to move downwardly through the rotating recess of the rotating control bracket and into the non-rotating recess of the non-rotating control bracket.

In one aspect, the gestation stall gate assembly further includes a spring that allows temporary extension of the length of the line.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a partial cross-section view of several components of the example free access sow gestation stall gate assembly of FIG. 1 in an initial, home, or latched configuration.

FIG. 5 is a partial cross-section view similar to FIG. 4, but with the components in a non-entry configuration.

FIG. 6 is a partial cross-section view similar to FIG. 4, but with the components in a locked closed configuration.

FIG. 7 is perspective view of several components of the example free access sow gestation stall gate assembly of FIG. 1 in the initial, home, or latched configuration.

FIG. 8 is a perspective view similar to FIG. 7, but with the components in the non-entry configuration.

FIG. 9 is a perspective view similar to FIG. 7, but with the components in a locked closed configuration.

FIG. 10 is a perspective view similar to FIG. 7, but with the components in an unlatching or unlatched configuration.

FIG. 11 is a side elevation view with the components in the unlatching or unlatched configuration.

FIG. 12 is a side elevation view similar to FIG. 11, but with the components in a resetting configuration.

FIG. 23 is a top plan view of several components of the example free access sow gestation stall gate assembly of FIG. 1 in the locked outwardly open gate configuration.

FIG. 24 is a top plan view similar to FIG. 23, but in the locked inwardly open gate configuration.

Corresponding reference numerals indicate corresponding parts throughout the several views of the drawings.

DETAILED DESCRIPTION

Figure 1:
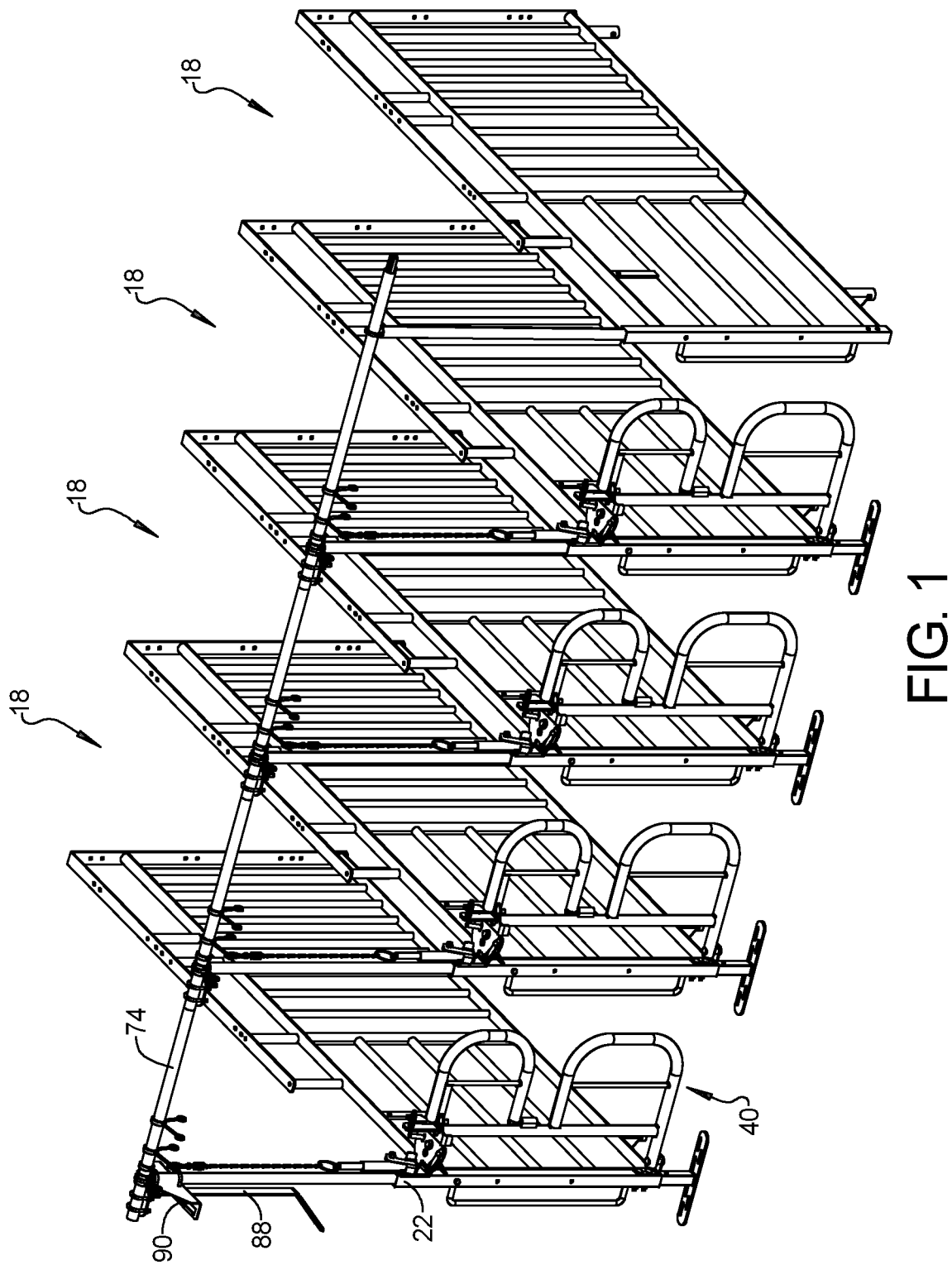
FIG. 1 is a perspective view of a plurality of sow gestation stalls including one example of a free access sow gestation stall gate assembly in accordance with the present disclosure.
Figure 2:
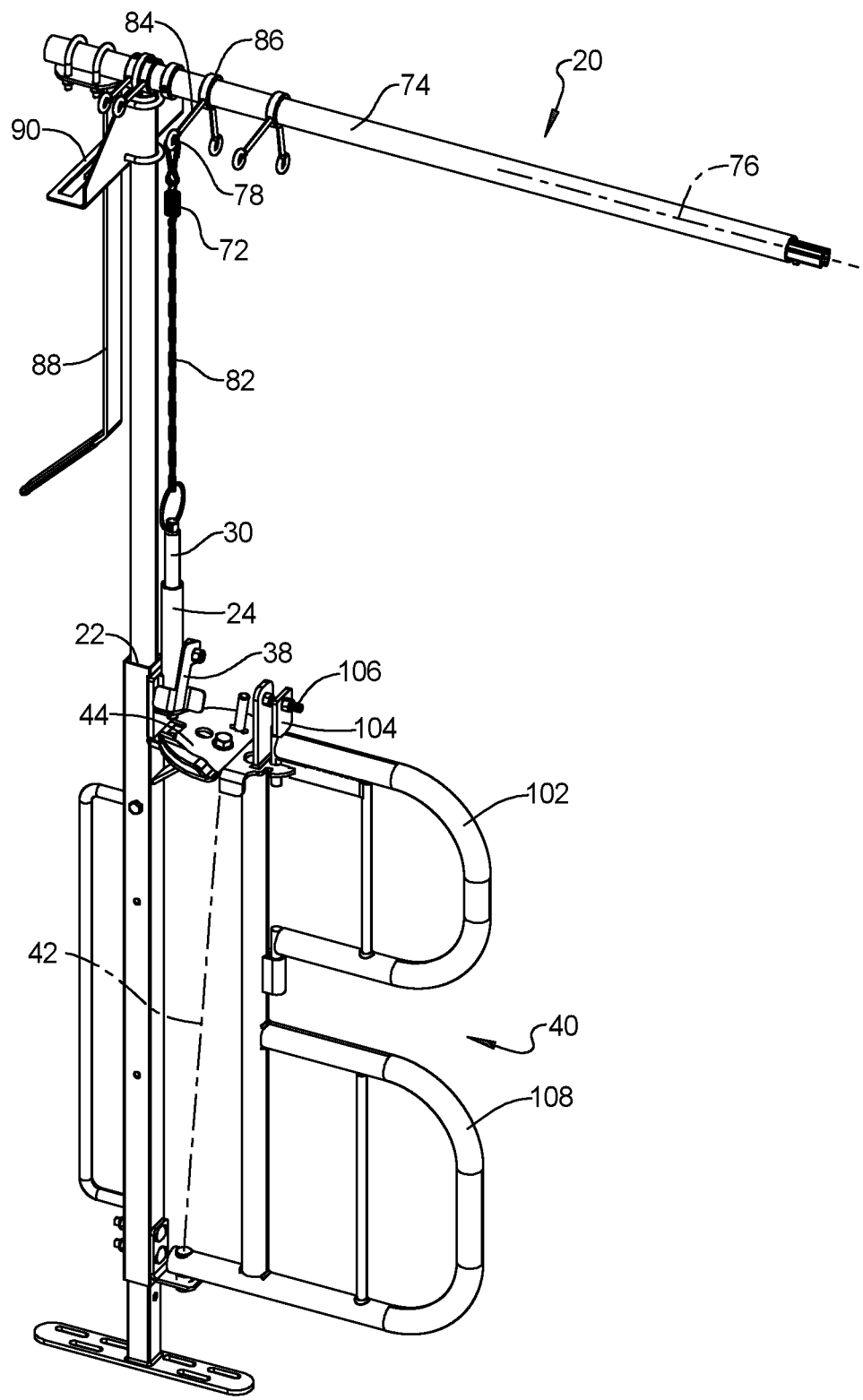
FIG. 2 is a perspective view of the example free access sow gestation stall gate assembly of FIG. 1.
Figure 3:
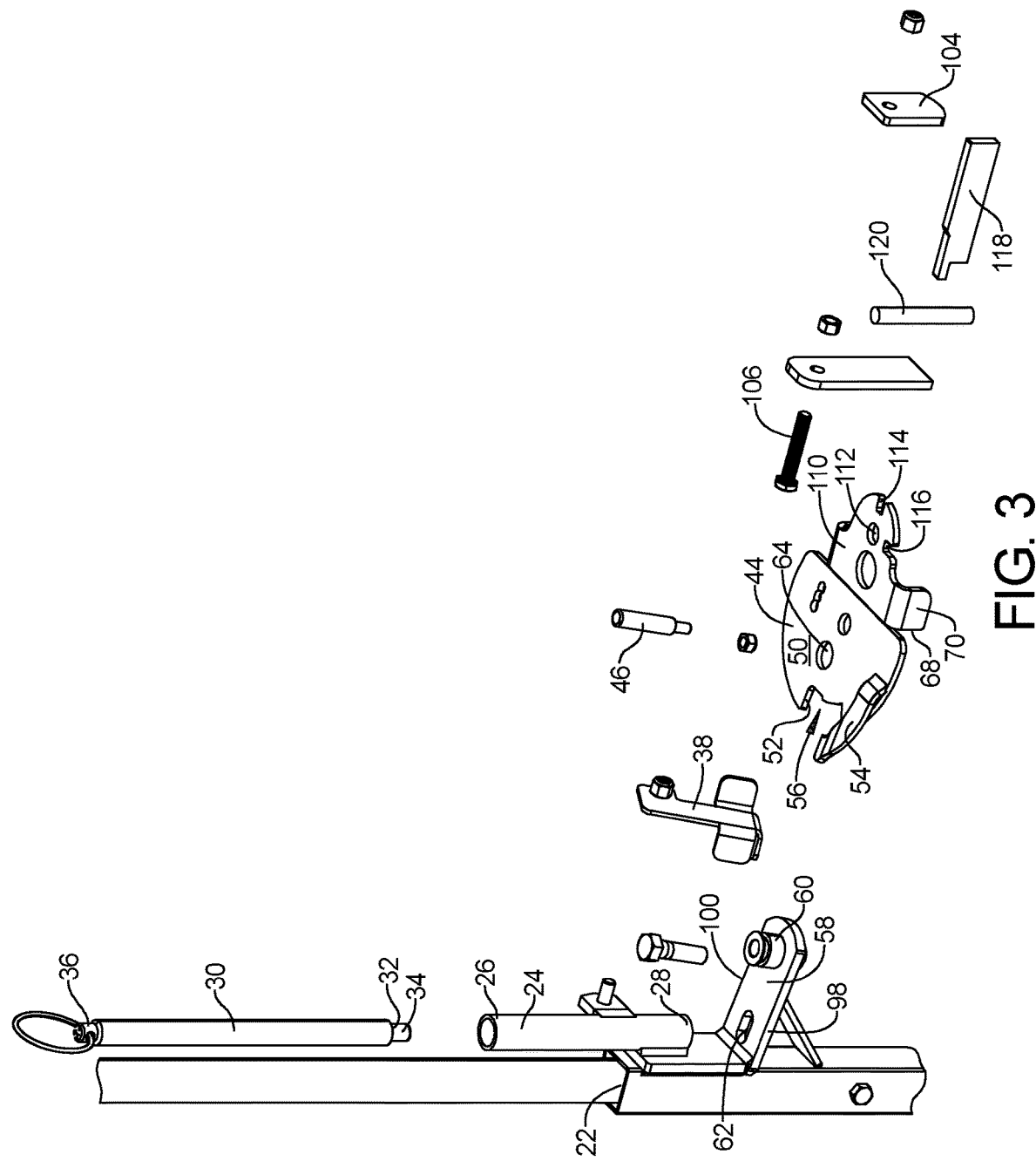
FIG. 3 is an exploded view of several components of the example free access sow gestation stall gate assembly of FIG. 1.
Figure 13:
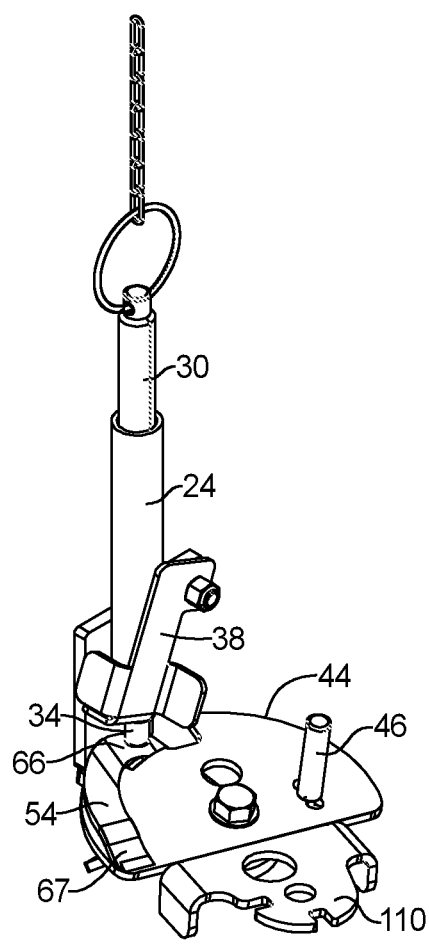
FIG. 13 is a perspective view similar to FIG. 7, but with the components in a configuration in which the locking bar is on the entry end of the resetting cam surface and being raised out of the rotating recess.
Figure 14:
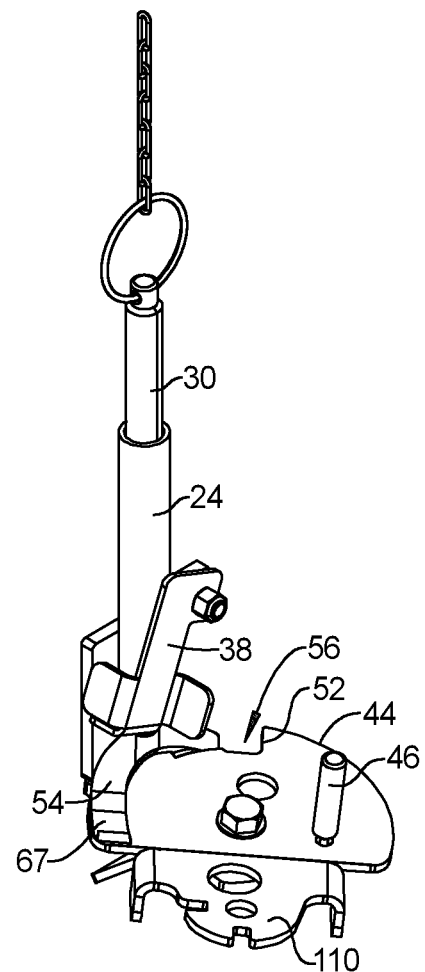
FIG. 14 is a perspective view similar to FIG. 7, but with the components in the resetting configuration.
Figure 15:
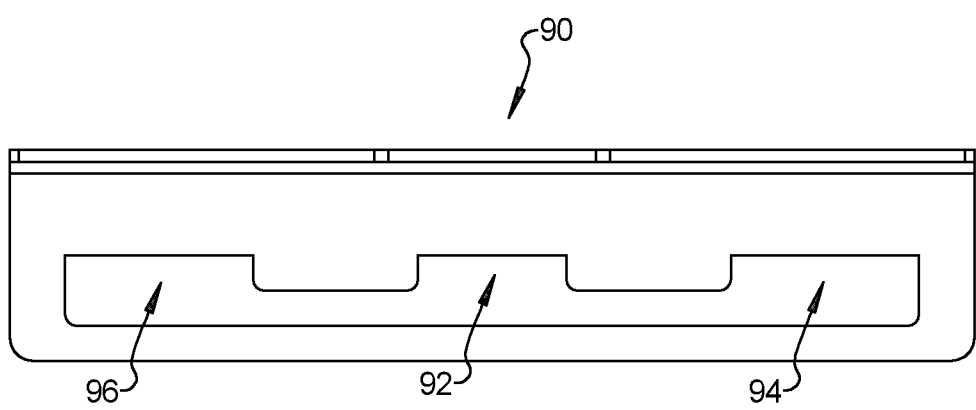
FIG. 15 is a top plan view of the arm bracket of the example free access sow gestation stall gate assembly of FIG. 1.
Figure 16:
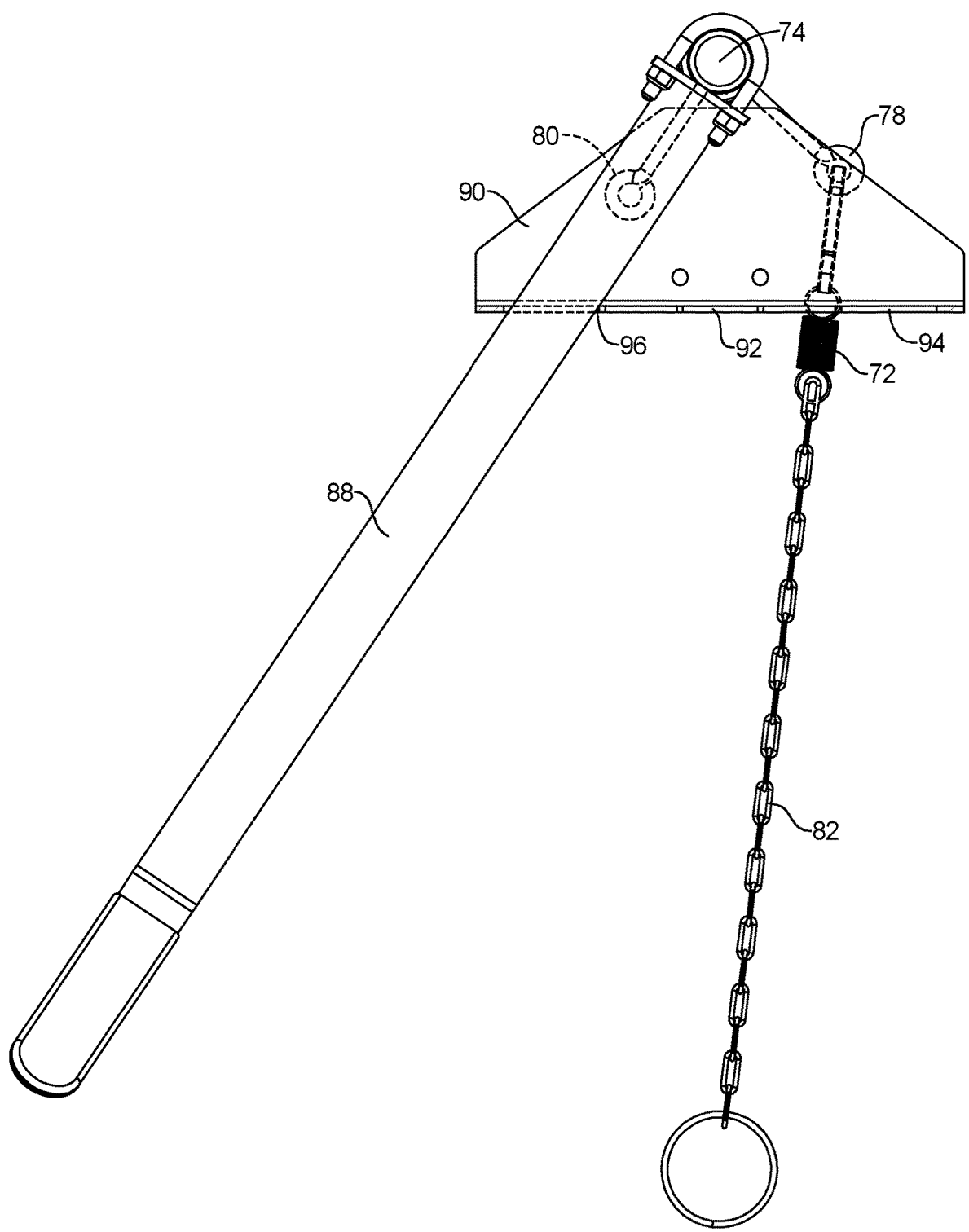
FIG. 16 is a side elevation view of several components of the example free access sow gestation stall gate assembly of FIG. 1 in a configuration with the control arm in the lower locking recess of the arm bracket.
Figure 17:
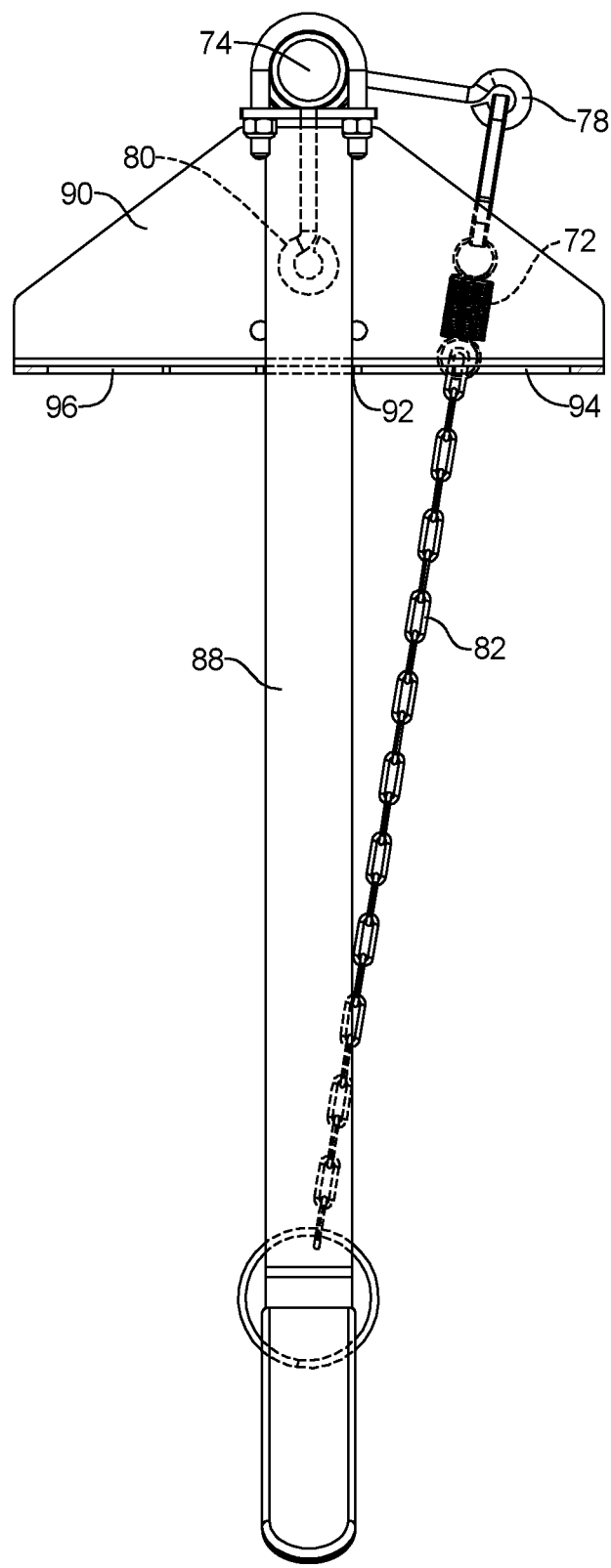
FIG. 17 is a side elevation view similar to FIG. 16, but in a configuration with the control arm in the center or middle locking recess of the arm bracket.
Figure 18:
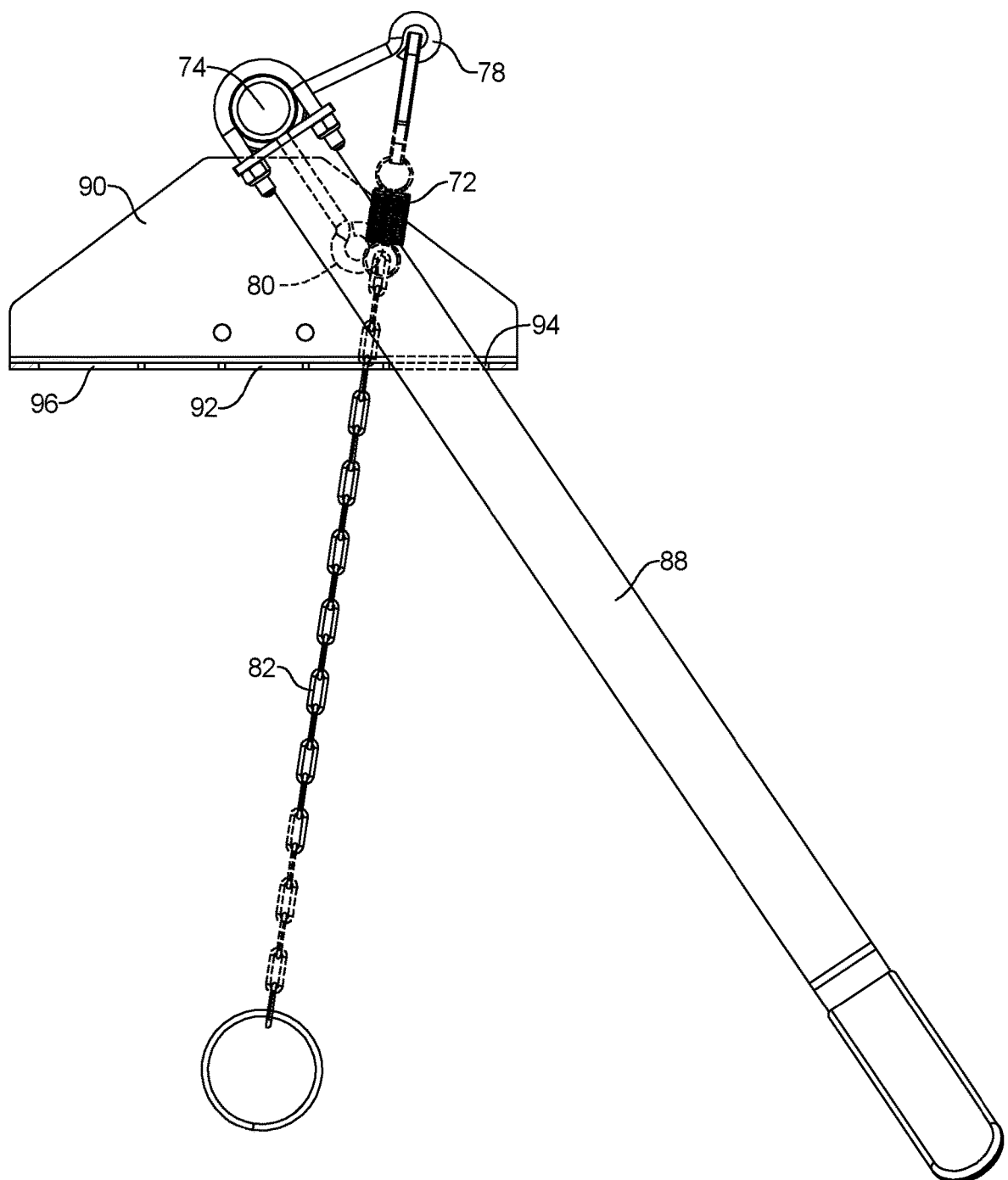
FIG. 18 is a side elevation view similar to FIG. 16, but in a configuration with the control arm in the lower locking recess of the arm bracket.

Example embodiments will now be described more fully with reference to the accompanying drawings.

One example of a free access sow gestation stall gate assembly 20 in accordance with the present disclosure is illustrated in FIGS. 1-27. A gate post or support 22 can have a sleeve 24 with an open upper or proximal sleeve end 26 and an open lower or distal sleeve end 28. A locking bar 30 can have a stop or latching surface 32 positioned between a lower or distal bar end 34 and an upper or proximal bar end 36 of the locking bar 30. The locking bar 30 can be slidably mounted in the sleeve 24. A latch 38 can be pivotably coupled to the gate post 22 and biased toward a latched position (FIG. 4) in which the latch 38 is positioned to engage the stop surface 32 of the locking bar 30 to stop downward movement of the locking bar 30 through the sleeve 24. As in the illustrated embodiment, the latch 38 can be positioned and oriented so it is biased by gravity toward the latching position. As one alternative, the latch 38 can be biased by a spring (not shown).

A gate 40 can be pivotably coupled to the gate support 22 to pivot around a pivot axis 42 extending upwardly and adjacent to the gate support 22 between an inwardly open gate position, a closed gate position, and an outwardly open gate position. The pivot axis 42 can extend essentially vertically as opposed to essentially horizontally, which results in the gate 40 rotating horizontally, instead of vertically. For example, the pivot axis 42 may be titled relative to a vertical axis by the minimum angle that enables gravity to bias the gate 40 toward the closed gate position. A rotating or gate control bracket 44 can be coupled to the gate 40 to rotate with the gate 40. The gate control bracket 44 can include a non-entry surface 52, a bar reset cam surface 54 and an unlatching surface 46. As in the illustrated example, a rotating recess 56 of the rotating or gate control bracket 44 can provide the non-entry surface 52 and the bar reset cam surface 54. The bar reset cam surface 54 and the non-entry surface 52 can be positioned on opposite or opposing sides of the rotating recess 56. As in this example, the rotating recess 56 can extend completely through the rotating control bracket 44 to provide an opening 56 through the rotating control bracket 44. An initial or entry end 66 of the bar reset cam surface 54 can extend down into the rotating recess 56. A second or opposite entry end 67 can be provided at the opposite end of the bar reset cam surface 54 away from the rotating recess 56.

The unlatching surface 46 can be positioned to engage a cooperating unlatching surface 48 of the latch 38 to disengage the latch 38 from the latching surface 32 of the locking bar 30 as the gate 40 rotates toward its inwardly open gate position. Such disengagement of the latch 38 from the latching surface 32 can allow the locking bar 30 to fall or move downwardly through the sleeve 24 until the locking bar 30 becomes supported by the rotating control bracket 44. As in this illustrated example, engagement of the distal or lower bar end 34 with an upper surface 50 of the rotating control bracket 44 can provide such support to the locking bar 30.

The gate 40 can be biased toward its closed gate position. As in the illustrated example, the gate 40 can be designed to move upwardly or hang such that rotation around an upwardly angled gate pivot axis 42 can bias the gate 40 closed by gravity. Additionally or alternatively, the gate 40 can be biased closed by a spring (not shown).

A non-rotating gate control bracket 58 can be coupled to or part of the gate support 22. This non-rotating control bracket 58 can be angled downwardly from the gate support 22. The angled gate pivot axis 42 can extend through a pivot opening 60 of the non-rotating control bracket 58, which pivot opening 60 can be used in pivotably coupling the gate 40 to the gate support 22. The non-rotating control bracket 58 can include a closed locking, or non-rotating recess 62. The closed locking recess 62 of the non-rotating control bracket 58 can be positioned under the rotating recess 56 of the rotating control bracket 44 when the gate 40 is in its closed gate position. The locking bar 30, the latch 38, the rotating control bracket 44, and/or the non-rotating control bracket 58 may be referred to as a gate control assembly. As used herein, the term "and/or" includes any and all combinations of one or more of the associated listed items.

The rotating control bracket 44 can include an open locking recess 64 positioned to enable the locking bar 30 extending through the open locking recess 64 to engage a cooperating open locking surface, such as outward surface 98 or inward surface 100, of the non-rotating control bracket 58 to lock or retain the gate 40 in an open gate position. The gate 40 can include a second stop surface 68, such as an edge of a downwardly extending tab 70 of the gate 40, that engages against an opposite edge or surface 100 or 98 of the non-rotating gate control bracket 58 so that the gate 40 is restricted from movement in either rotational direction when the gate 40 is locked in either the inwardly open gate position or outwardly open gate position.

An overhead control rod 74 can be coupled to an upper end of the gate support 22 to rotate around its central longitudinal axis 76. The control rod 74 can include a first coupling 78 positioned radially outwardly from the central longitudinal axis 76 at a first height. The control rod 74 can include a second coupling 80 positioned radially outwardly from the central longitudinal axis 76 at a second height that is lower than the first height. As in the illustrated example, each of the first coupling 78 and the second coupling 80 can be provided by an eyelet 84 with a locking collar 86 to adjustably couple the couplings 78 and 80 to the control rod 74.

A line 82 can couple the locking bar 30 to the control rod 74 to limit downward movement of the locking bar 30. For example, the line 82 can be selectively coupled to the first coupling 78 or the second coupling 80. As non-limiting examples, the line can be a chain, a rope, a wire, a cable, or combinations thereof. The line 82 can include a spring 72 to allow temporary extension of the length of the line 82.

A control arm 88 can be coupled to the control rod 74 to extend radially outwardly therefrom. The control arm 88 can be coupled to the control rod 74 to rotate the control rod 74 about its central longitudinal axis 76. The control arm 88 can extend through an arm bracket 90 coupled to the gate support 22 adjacent to its upper end. The arm bracket 90 can include a plurality of recesses 92, 94, 96 to receive and retain the control arm 88 in one of a plurality of positions. For example, the arm bracket 90 can include a central or middle position recess 92, an upper position recess 94, and a lower position recess 96. The middle or center position recess 92 can correspond to the first coupling 78 being positioned at a middle or center position or height (FIG. 5). The upper position recess 94 can correspond to the first coupling 78 being positioned at an upper position or height (FIG. 4) that is higher than the middle or center height. The lower position recess 96 can correspond to the first coupling 78 being positioned at a lower position or height (FIG. 6) that is lower than the middle or center height. The spring 72, the control rod 74, the first coupling 78, the second coupling 80, the control arm 88, and/or the arm bracket 90 may be considered part of the gate control assembly.

The gestation stall gate assembly 20 can have a first mode of operation in which a sow is permitted to enter an empty stall 18, but is prevented from entering a stall 18 that another sow is already occupying. This first mode of operation of the gate assembly 20 can correspond to the control arm 88 being positioned in the middle or center position recess 92 of the arm bracket 90 with the control rod 74 rotationally oriented to position the first coupling 78 at the middle or center position or height.

In this first or single entry mode of operation, a sow can push against the outside of the gate 40 to rotate the gate 40 toward its inwardly open gate position as the sow enters an empty stall 18. As the gate 40 rotates inwardly, the unlatching surface 46 of the rotating control bracket 44 can contact the cooperating unlatching surface 48 of the latch 38 to cause the latch 38 to rotate away from, and disengage from, the latching surface 32 of the locking bar 30. As a result, the locking bar 30 can slide downwardly through the sleeve 24 until the locking bar 30 becomes supported by the upper surface 50 of the rotating control bracket 44. Alternatively, the line 82 can stop downward movement of the locking bar 30, and the rotating recess 56 can have an adjacent cam surface (not shown) to raise the locking bar 30 into the rotating recess 56.

Upon entry, the gate 40 can rotate back toward its closed gate position as biased. During this rotation, the rotating recess 56 can rotate into position under the locking bar 30, and the locking bar 30 can fall into the rotating recess 56. The line 82 can stop the downward movement of the locking bar 30 and can support the locking bar 30 with the lower bar end 34 of the locking bar 30 positioned within the rotating recess 56 of the rotating control bracket 44. The line 82 can position the lower bar end 34 of the locking bar 30 at a height above the closed locking or non-rotating recess 62 of the non-rotating gate control bracket 58. The line 82 can position and support the lower bar end 34 of the locking bar 30 above a first or entry end 66 of the resetting cam surface 54 of the rotating gate control bracket 44. In this first or non-entry configuration, attempted entry by movement of the gate 40 toward its inwardly open gate position can result in the lower bar end 34 engaging the non-entry surface 52 of the rotating recess 56 to prevent another sow from entering through the gate 40 into an occupied stall 18.

In this non-entry configuration, a sow occupying a stall 18 can push the gate 40 toward its outwardly open gate position as the sow exits the stall 18. During this outwardly open rotation of the gate 40 and rotating control bracket 44, the lower end 34 of the locking bar 30 can engage the entry end 66 and ride along the bar reset cam surface 54 to raise the latching surface 32 of the locking bar 30 to a reset position or height in which the cooperating latching surface 48 of the latch 38 moves into position under the latching surface 32. As the gate 40 rotates back toward its closed gate position, the locking bar 30 can move downwardly until the cooperating latching surface 48 of the latch 38 again engages the latching surface 32 to support the locking bar 30 in the initial or home position above the rotating recess 56.

The gestation stall gate assembly 20 can have a second or free movement mode of operation in which sows are permitted to enter and leave the stalls 18 as they desire. This second mode of operation of the gate assembly 20 can correspond to the control arm 88 being positioned in the upper position recess 94 of the arm bracket 90 with the control rod 74 rotationally oriented to position the first coupling 78 at the upper position or height that is above or higher than the middle or center position or height of the first coupling 78.

In this second or free movement mode of operation, as a sow pushes the gate 40 toward the inwardly open gate position upon entering the stall 18, the line 82 can support the lower bar end 34 of the locking bar 30 in a position above the non-entry surface 52 of the rotating recess 56. As one example, the line 82 can support the locking bar 30 in a position or height that is above where the latch 38 can engage the latching surface 32 of the locking bar 30.

As another example, the unlatching surface 46 of the rotating control bracket 44 can contact the cooperating unlatching surface 48 of the latch 38 to disengage the latch 38 from the locking bar 30 during movement of the gate 40 toward the inwardly open gate position. The line 82 can stop the downward movement of the locking bar 30 and can support the lower bar end 34 of the locking bar 30 in a position above the non-entry surface 52 of the rotating recess 56. In this example, the locking bar 30 can be reset into its initial position with the latch 38 engaging the latching surface 32 by the locking bar 30 engaging and riding along the reset cam surface 54. Because the line 82 can support the lower bar end 34 of the locking bar 30 in a position above the non-entry surface 52 of the rotating recess 56, sows can freely enter and exit the stalls 18.

The gestation stall gate assembly 20 can have a third or lock upon entry mode of operation in which a sow is permitted to enter an empty stall 18, but the sow becomes locked in the stall 18 upon entry. This third, lock on entry mode of operation of the gate assembly 20 can correspond to the control arm 88 being positioned in the lower position recess 96 of the arm bracket 90 with the control rod 74 rotationally oriented to position the first coupling 78 at the lower position or height that is below the middle or center position or height.

In this third, lock on entry mode of operation, a sow can push the gate 40 toward its inwardly open gate position as the sow enters an empty stall 18. As the gate 40 rotates inwardly, the unlatching surface 46 can contact the cooperating unlatching surface 48 of the latch 38 to cause the latch 38 to disengage the latching surface 32 of the locking bar 30. As a result, the locking bar 30 can slide downwardly through the sleeve 24 until engagement with the upper surface 50 of the rotating control bracket 44 stops its downward movement and supports the locking bar 30. Similar to the first mode of operation, the rotating recess 56 can become aligned with the locking bar 30 as the gate 40 returns to its closed gate position after sow entry. In this third mode of operation, however, the line 82 can permit the lower bar end 34 to move downwardly to become positioned and supported in the rotating recess 56 at a height below the entry end 66 of the reset cam surface 54. The line 82 can permit the lower bar end 34 to move downwardly to become positioned and supported at a height in which the lower bar end 34 is positioned within the closed locking or non-rotating recess 62 of the non-rotating control bracket 58. Alternatively, the latching surface 32 of the locking bar 30 can engage an edge of the non-rotating recess 62 to stop downward movement of the locking bar 30 at this position or height. Engagement of the locking bar 30 against the entry end 66 of the reset cam surface 54 of or in the rotating recess 56 can stop movement out of the closed gate position and toward the outwardly open gate position. Thus, the locking bar 30 can become trapped in the rotating recess 56 to lock the gate 40 in its closed gate position.

Examples for unlocking the gate 40 and resetting the locking bar 30 with the latch 38 supporting it in the sleeve 24 can include manually grasping and lifting the line 82 to raise and reset the locking bar 30 for individual stalls 18. Alternatively or additionally, rotating the control arm 88 into or beyond the upper or higher position recess with the line 82 coupled to the first coupling 78 can simultaneously raise and reset the locking bars 30 of multiple stalls 18. The line 82 can include the spring 72 to allow for some temporary elongation of the line 82. For example, such temporary elongation of the line 82 can permit an operator or user to rotate the control arm 88 between the various positions or recesses 92, 94, 96, even during times when one or more sows are pushing against a locked gate 40 and preventing upward repositioning of the locking bar 30. When the sow thereafter ceases pushing against a locked gate 40, the spring 72 will return to its home state and raise the locking bar 30 to its proper position for the selected mode of operation.

In addition to the three modes of operation, individual stalls 18 can be manually locked in an open gate position or a closed gate position, independently of which mode of operation is selected using the control arm 88 for the gates 40 of the stalls 18. Locking a gate 40 of an individual stall 18 either in an open gate position, or a closed gate position can each involve uncoupling the line 82 from the first coupling 78. The line 82 can be moved to and coupled to the second coupling 80. In some cases, the second coupling 80 can be coupled to the control rod 74 and positioned at a height that is lower than the height of the position of the first coupling 78 in both the first and second modes of operation. In some cases, the second coupling 80 can be coupled to the control rod 74 and positioned at a height that is lower than the height of the position of the first coupling 78 in each of the first, second, and third modes of operation.

To manually lock a gate 40 of an individual stall 18 in a closed gate position, a user can simply manually trip the latch 38 to release the locking bar 30, allowing the bar 30 to fall downward. With the line 82 uncoupled from the first coupling 78 and coupled to the second coupling 80, and the gate 40 in the closed gate position, the locking bar 30 can fall downward until it extends into the rotating recess 56 of the rotating control bracket 44, and can further extend into the closed locking recess 62 of the non-rotating control bracket 58. Thus, the selected individual gate 40 can be locked closed, similar to how the gates 40 are locked closed in the third, lock on entry mode of operation. The selected individual gate 40 can remain locked in the closed gate position until it is manually unlocked. The gate 40 can be manually unlocked by lifting the locking bar 30 and resetting it to its latched position, with the latch 38 engaging the latching surface 32 of the locking bar 30. This can be done, for example, while uncoupling and moving the line 82 from the second coupling 80 to the first coupling 78, so movement of the control arm 88 will control the gate 40 of the individual stall 18 in the same mode of operation selected for the other stalls 18.

Figure 21:
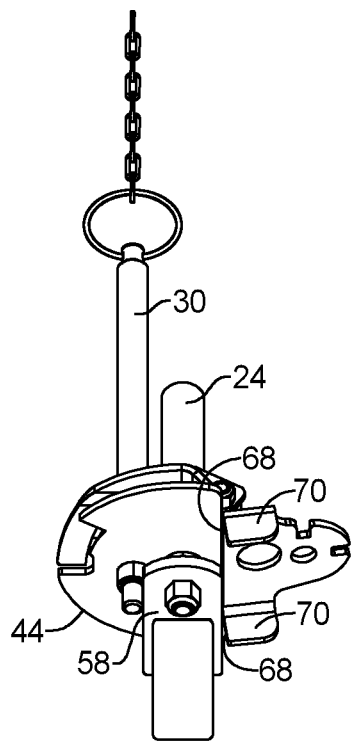
FIG. 21 is a perspective view similar to FIG. 19, but in a locked inwardly open gate configuration.
Figure 22:
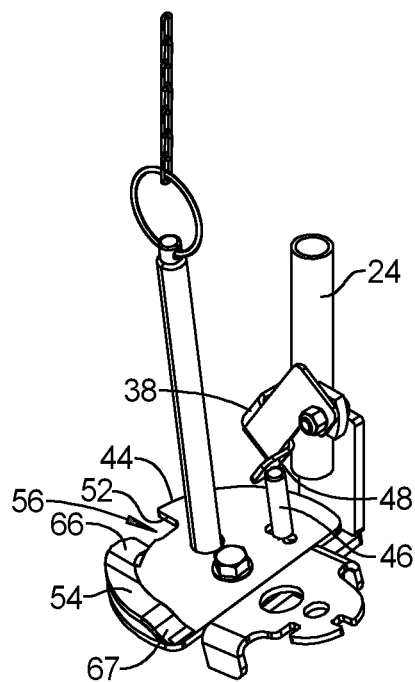
FIG. 22 is a perspective view similar to FIG. 20, but in a locked inwardly open gate configuration.

To manually lock a gate 40 of an individual stall 18 in an open gate position, a user can manually raise the locking bar 30 out of the sleeve 24 and place or position it through the open locking recess 64 of the rotating control bracket 44 with the gate 40 positioned in the selected open gate position. As shown in FIGS. 21, 22 and 24, the locking bar 30 can be placed in the open locking recess 64 to position the locking bar 30 against the outward or front edge or surface 98 of the non-rotating control bracket 58 with the gate 40 in the inwardly open gate position to lock the gate 40 in that position. The downwardly extending tab 70 of the rotating control bracket 44 can engage against the opposite, inward or rear edge or surface 100 of the non-rotating control bracket 58 to restrict movement in either direction and further lock the gate 40 in the inwardly open gate position.

Figure 19:
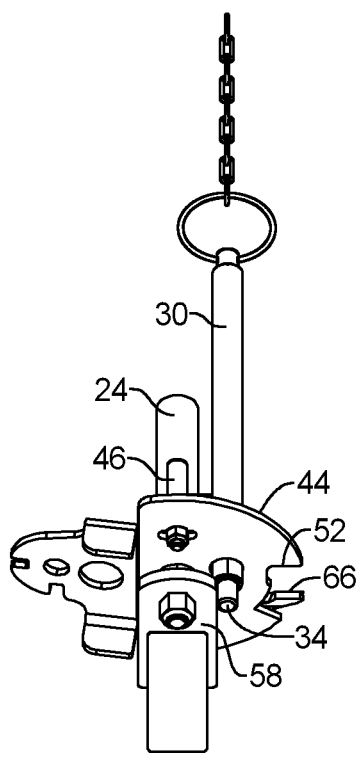
FIG. 19 is a perspective view of several components of the example free access sow gestation stall gate assembly of FIG. 1 in a locked outwardly open gate configuration.
Figure 20:
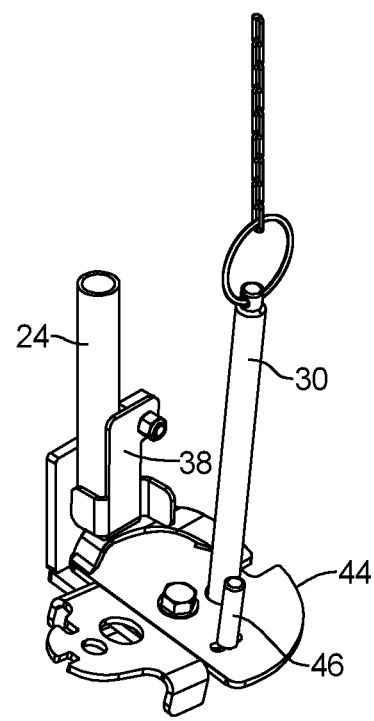
FIG. 20 is another perspective view of the several components of FIG. 19 in the locked outwardly open gate configuration.

As shown in FIGS. 19, 20, and 23, to lock the gate 40 in the outwardly open gate position, the locking bar 30 can be placed in the open locking recess 64 to position the locking bar 30 against the inward or rear edge or surface 100 of the non-rotating control bracket 58 with the gate 40 in the outwardly open gate position. The rotating control bracket 44 can include another downwardly extending tab 70 that can engage against the opposite, outward or front edge or surface 98 of the non-rotating control bracket 58 to restrict movement in either direction and further lock the gate 40 in the outwardly open gate position.

Figure 25:
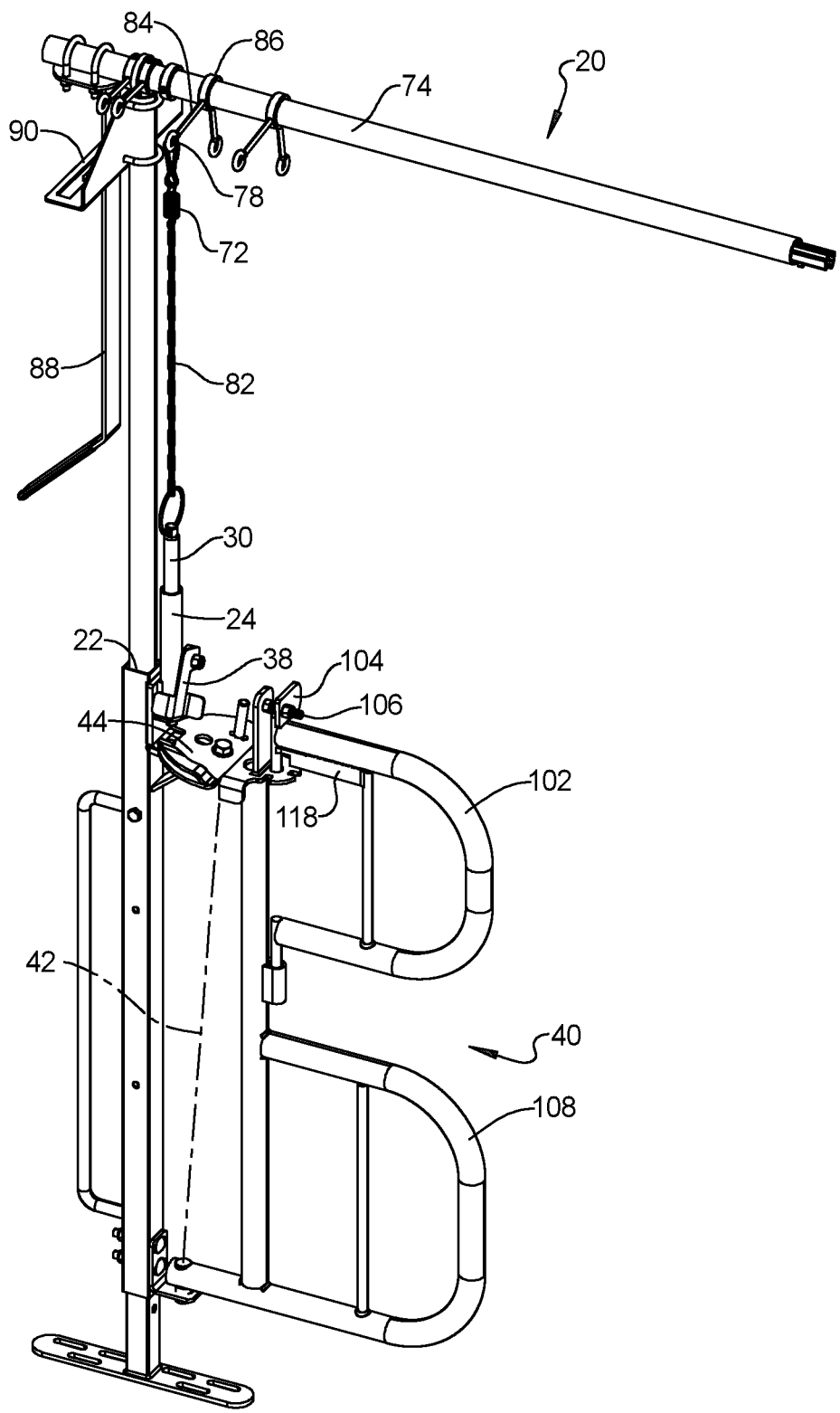
FIG. 25 is a perspective view similar to FIG. 2, but with the section locking tab in an unlocked position, as opposed to the locked positon of FIG. 2.
Figure 26:
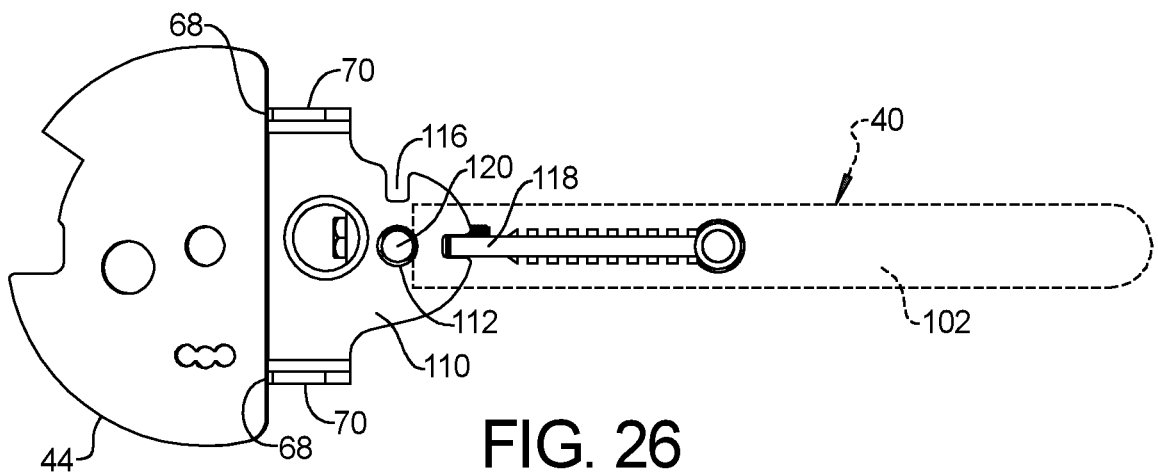
FIG. 26 is a bottom plan view of several components of the example free access sow gestation stall gate assembly of FIG. 1 in a closed repositionable section configuration.
Figure 27:
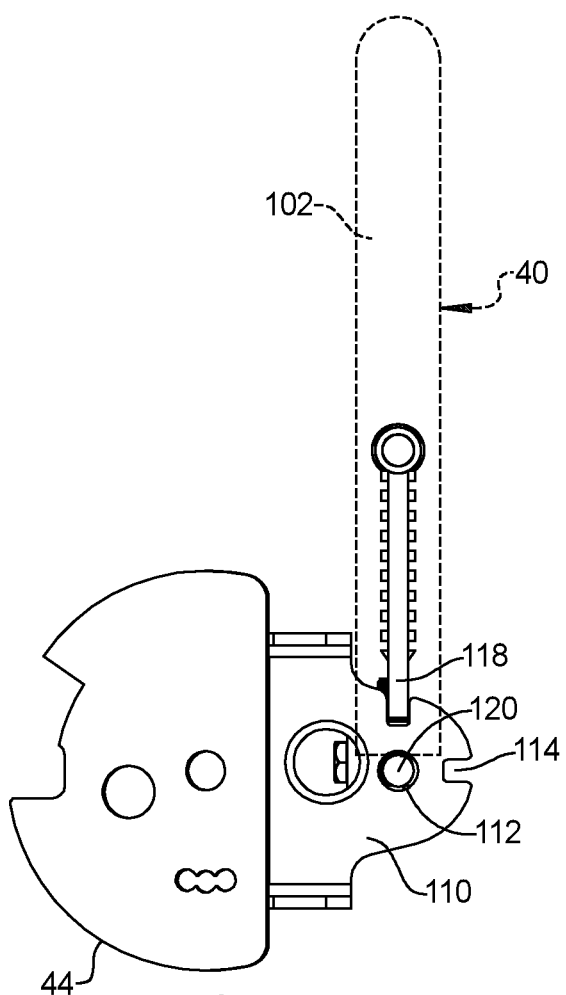
FIG. 27 is a bottom plan view similar to FIG. 26, but in an open repositionable section configuration.

Referring to FIGS. 25-27, it can be desirable to selectively provide more open or unrestricted access to a sow in the stall 18 while the gate 40 is in the closed gate position. Thus, the gate 40 can include a selectively repositionable upper section 102 of the gate 40 that can be moved between a closed section position (FIG. 26) and an open section position (FIG. 27), while a remaining or lower section 108 of the gate 40 remains in the closed gate position. In the closed section position, the repositionable gate section 102 can be aligned with the remaining gate section 108. In the open section position, the repositionable gate section 102 can be rotated outwardly relative to the remaining gate section 108 into an outwardly open section position.

The gate 40 can include a section locking tab 104 that is moveable between a section locked position (FIG. 2), and a section unlocked position (FIG. 25). The section locking tab 104 can be biased toward the section locked position. As in the illustrated example, gravity can bias the section locking tab 104 toward the section locked position. In addition, the locking tab 104 can be supported on a threaded rod 106, and can be rotated about the rod 106 between the section locked position and the section unlocked position. In other examples, a spring (not shown) can bias the section locking tab 104 toward the section locked position, and the section locking tab 104 can be slid along a rod, or slide between the locked and unlocked tab positions.

The gate 40 can include a gate section bracket 110 including a pivot recess 112, a closed section positioning recess 114, and an open section positioning recess 116. The repositionable gate section 102 can include an upper pivot shaft 120 that is supported in the section pivot recess 112 of the section bracket 110. The gate 40 can include a section positioning protrusion 118 that can be selectively received in the closed section positioning recess 114 and the open section positioning recess 116. As in the illustrated example, each of the section pivot recess 112, the closed section positioning recess 114, and the open section positioning recess 116 can be completely separate recesses. Alternatively, these can each be portions of a single recess. As another option, no open section positioning recess 116 can be provided.

With the gate 40 in the closed gate position and the repositionable or movable gate section 102 in the closed section position, a user can rotate the repositionable gate section 102 into the open section position, while the remaining gate section 108 remains in its closed gate position. For example, the user can manually rotate the section locking tab 104 into its unlocked tab position. This can allow the repositionable upper gate section 102 to be manually raised upwardly to cause the section positioning protrusion 118 of the gate section 102 to move upwardly out of the closed section positioning recess 114 of the section bracket 110. The pivot shaft 120 can remain in the pivot recess 112, so that the gate section 102 can be stabilized during rotation. This can facilitate keeping the section positioning protrusion 118 properly positioned so it can easily align with and fall down into the open section positioning recess 116 when the repositionable gate section 108 is rotated into its outwardly open section position.

To move the gate section 108 back into its closed section position, a user can simply raise the gate section 108 and pivot it back into its closed section position with the section positioning protrusion 118 alignment with the closed section positioning recess 114, and allowing the section positioning protrusion 118 move down into the recess 114. As in this example, the gate 40 can engage the section locking tab 104 and move it into its section unlocked position simply by rotating the gate section 108 into its closed section position. In other words, there can be no need for any separate manual manipulation of the section locking tab 104 during this gate section closing operation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gestation stall gate assembly comprising:
a gate support including a sleeve;
a gate coupled to the gate support in a way that enables the gate to pivot around a pivot axis between an inwardly open gate position, a closed gate position, and an outwardly open gate position; and
a gate control assembly configured to:
allow the gate to pivot from the closed gate position to the inwardly open gate position when a sow pushes against the gate to pivot the gate toward the inwardly open gate position;
prevent the gate from pivoting from the closed gate position to the inwardly open gate position for a second time until the gate is pivoted from the closed gate position to the outwardly open gate position;
and allow the gate to pivot from the closed gate position to the outwardly open gate position when the sow pushes against the gate to pivot the gate toward the outwardly open gate position,
wherein the gate control assembly includes:
a locking bar slidably mounted in the sleeve of the gate support;
a control rod coupled to the gate support and rotatable about a central longitudinal axis of the control rod,
a line that couples the locking bar to the control rod to limit downward movement of the locking bar;
a first coupling coupled to the control rod and configured to couple the line to the control rod;
a control arm coupled to the control rod and moveable to rotate the control rod about the central longitudinal axis thereof; and
an arm bracket through which the control arm extends, the arm bracket having a plurality of recesses for receiving and retaining the control arm in one of a plurality of positions to adjust a height of the first coupling, wherein the plurality of recesses include a middle position recess, an upper position recess, and a lower position recess, the middle position recess corresponding to the first coupling being positioned at a middle height, the upper position recess corresponding to the first coupling being positioned at an upper height that is higher than the middle height, the lower position recess corresponding to the first coupling being positioned at a lower height that is lower than the middle height.

2. The gestation stall gate assembly of claim 1 wherein the force of the sow pushing against the gate alone is sufficient to pivot the gate from the closed gate position to the inwardly open gate position and from the closed gate position to the outwardly open gate position.

3. The gestation stall gate assembly of claim 1 wherein the gate control assembly is free of any electronic or pneumatic components.

4. The gestation stall gate assembly of claim 1 wherein the force of gravity biases the gate toward the closed gate position.

5. The gestation stall gate assembly of claim 1 wherein the pivot axis extends essentially vertically.

6. The gestation stall gate assembly of claim 1 wherein the gate control assembly further includes:
a latch pivotably coupled to the gate support and biased into engagement with the locking bar to stop downward movement of the locking bar; and
a rotating control bracket coupled to the gate for rotation therewith, wherein as the gate pivots toward the inwardly open gate position, the rotating control bracket disengages the latch from the locking bar, which allows the locking bar to move downward to the rotating control bracket and prevent the gate from pivoting to the inwardly open gate position again, and as the gate pivots toward the outwardly open gate position, the rotating control bracket raises the locking bar to enable the latch to reengage the locking bar.

7. The gestation stall gate assembly of claim 6 wherein:
the locking bar has an upper end, a lower end, and a latching surface positioned between the upper and lower ends;
the latch is biased toward a latched position in which the latch engages the latching surface of the locking bar to prevent the locking bar from moving downward;
the rotating control bracket has a rotating recess and an unlatching surface; and
as the gate pivots toward the inwardly open gate position, the unlatching surface of the rotating control bracket engages the latch and thereby moves the latch from the latched position to an unlatched position in which the locking bar is allowed to move downwardly into the rotating recess of the rotating control bracket.

8. The gestation stall gate assembly of claim 7 wherein the rotating control bracket has a non-entry surface positioned on one side of the rotating recess, and when an attempt is made to pivot the gate from the closed gate position to the inwardly open gate position while the locking bar is positioned within the rotating recess, the lower end of the locking bar engages the non-entry surface of the rotating recess to prevent the gate from rotating to the inwardly open gate position.

9. The gestation stall gate assembly of claim 8 wherein the rotating control bracket has a bar reset cam surface positioned on another side of the rotating recess opposite of the non-entry surface, and when the gate is pivoted from the closed gate position to the outwardly open gate position while the locking bar is positioned within the rotating recess, the lower end of the locking bar engages the bar reset cam surface and slides along the bar reset cam surface, which raises the latching surface of the locking bar to a latching height at which the latch reengages the latching surface.

10. The gestation stall gate assembly of claim 1 wherein the gate control assembly further includes a spring that allows temporary extension of the length of the line.

11. The gestation stall gate assembly of claim 1 wherein the gestation stall gate assembly is configured to be disposed at only one end of a stall.

12. The gestation stall gate assembly of claim 7 wherein:
when the control arm is positioned in the middle position recess, the gate control assembly prevents pivoting of the gate from the closed gate position to the inwardly open gate position more than one time without pivoting the gate from the closed gate position to the outwardly open gate position;
when the control arm is positioned in the upper position recess, the gate control assembly allows the gate to pivot from the closed gate position to the inwardly open gate position more than one time regardless of whether the gate is pivoted from the closed gate position to the outwardly open gate position; and
when the control arm is positioned in the lower position recess and the gate returns to the closed gate position after pivoting to the inwardly open gate position, the gate control assembly locks the gate in the closed gate position.

13. The gestation stall gate assembly of claim 12 wherein when the control arm is positioned in the middle position recess and the gate returns to the closed gate position from the inwardly open gate position, the line positions the lower end of the locking bar within the rotating recess of the rotating control bracket.

14. The gestation stall gate assembly of claim 12 wherein when the control arm is positioned in the upper position recess and the gate returns to the closed gate position from the inwardly open gate position, the line supports the lower end of the locking bar in a position above the rotating recess of the rotating control bracket.

15. A gestation stall gate assembly comprising:
a gate support including a sleeve;
a gate coupled to the gate support in a way that enables the gate to pivot around a pivot axis between an inwardly open gate position, a closed gate position, and an outwardly open gate position; and
a gate control assembly configured to:
allow the gate to pivot from the closed gate position to the inwardly open gate position when a sow pushes against the gate to pivot the gate toward the inwardly open gate position;
prevent the gate from pivoting from the closed gate position to the inwardly open gate position for a second time until the gate is pivoted from the closed gate position to the outwardly open gate position; and
allow the gate to pivot from the closed gate position to the outwardly open gate position when the sow pushes against the gate to pivot the gate toward the outwardly open gate position,
wherein the gate control assembly includes:
a locking bar slidably mounted in the sleeve of the gate support;
a control rod coupled to the gate support and rotatable about a central longitudinal axis of the control rod;
a line that couples the locking bar to the control rod to limit downward movement of the locking bar;
a first coupling coupled to the control rod and configured to couple the line to the control rod;
a control arm coupled to the control rod and moveable to rotate the control rod about the central longitudinal axis thereof;
an arm bracket through which the control arm extends, the arm bracket having a plurality of recesses for receiving and retaining the control arm in one of a plurality of positions to adjust a height of the first coupling; and
a non-rotating control bracket fixed to the gate support and having a non-rotating recess extending therethrough,
wherein the plurality of recesses include a middle position recess, an upper position recess, and a lower position recess, the middle position recess corresponding to the first coupling being positioned at a middle height, the upper position recess corresponding to the first coupling being positioned at an upper height that is higher than the middle height, the lower position recess corresponding to the first coupling being positioned at a lower height that is lower than the middle height, and
when the control arm is positioned in the lower position recess and the gate returns to the closed gate position from the inwardly open gate position, the line permits a lower end of the locking bar to move downwardly through the rotating recess of the rotating control bracket and into the non-rotating recess of the non-rotating control bracket.

16. The gestation stall gate assembly of claim 15 wherein:
the locking bar has an upper end, the lower end, and a latching surface positioned between the upper and lower ends;
the gate control assembly further includes a latch pivotably coupled to the gate support and biased into engagement with the locking bar to stop downward movement of the locking bar;
the latch is biased toward a latched position in which the latch engages the latching surface of the locking bar to prevent the locking bar from moving downward;
the rotating control bracket has a rotating recess and an unlatching surface; and
as the gate pivots toward the inwardly open gate position, the unlatching surface of the rotating control bracket engages the latch and thereby moves the latch from the latched position to an unlatched position in which the locking bar is allowed to move downwardly into the rotating recess of the rotating control bracket;
the gate control assembly further includes a second coupling coupled to the control rod and positioned at a height that is lower than the height of the first coupling when the control arm is positioned in either one of the middle and upper position recesses; and
when the gate is in the closed gate position and the latch is moved from the latched position to the unlatched position after the line is uncoupled from the first coupling and coupled to the second coupling, the line permits the lower end of the locking bar to move downwardly through the rotating recess of the rotating control bracket and into the non-rotating recess of the non-rotating control bracket and thereby locks the gate in the closed gate position.

17. The gestation stall gate assembly of claim 15 wherein:
the rotating control bracket includes a first downwardly extending tab;
the rotating control bracket has an open locking recess; and
when the locking bar is placed in the open locking recess while the gate is in the inwardly open gate position, the locking bar and the first downwardly extending tab of the rotating control bracket engage outward and inward edges of the non-rotating control bracket, respectively, to lock the gate in the inwardly open gate position.

18. The gestation stall gate assembly of claim 17 wherein:
the rotating control bracket includes a second downwardly extending tab; and
when the locking bar is placed in the open locking recess while the gate is in the outwardly open gate position, the locking bar and the second downwardly extending tab of the rotating control bracket engage the inward and outward edges of the non-rotating control bracket, respectively, to lock the gate in the inwardly outwardly open gate position.

19. A gestation stall gate assembly comprising:
a gate support including a sleeve;
a gate coupled to the gate support in a way that enables the gate to pivot around a pivot axis between an inwardly open gate position, a closed gate position, and an outwardly open gate position; and
a gate control assembly configured to:
allow the gate to pivot from the closed pate position to the inwardly open gate position when a sow pushes against the gate to pivot the pate toward the inwardly open pate position;
prevent the gate from pivoting from the closed gate position to the inwardly open gate position for a second time until the gate is pivoted from the closed gate position to the outwardly open gate position; and
allow the gate to pivot from the closed gate position to the outwardly open gate position when the sow pushes against the gate to pivot the pate toward the outwardly open gate position,
wherein the gate includes a lower section and an upper section that is rotatable with the lower section and moveable between a closed section position and an open section position while the lower section of the gate remains in the closed gate position, and
wherein the gate control assembly includes:
a locking bar slidably mounted in the sleeve of the gate support;
a control rod coupled to the gate support and rotatable about a central longitudinal axis of the control rod;
a line that couples the locking bar to the coupling of the control rod to limit downward movement of the locking bar;
a coupling coupled to the control rod and configured to couple the line to the control rod;
a control arm coupled to the control rod and moveable to rotate the control rod about the central longitudinal axis thereof; and
an arm bracket through which the control arm extends, the arm bracket having a plurality of recesses for receiving and retaining the control arm in one of a plurality of positions to adjust a height of the coupling,
wherein the plurality of recesses include a middle position recess, an upper position recess, and a lower position recess, the middle position recess corresponding to the coupling being positioned at a middle height, the upper position recess corresponding to the coupling being positioned at an upper height that is higher than the middle height, the lower position recess corresponding to the coupling being positioned at a lower height that is lower than the middle height.

20. The gestation stall gate assembly of claim 19 wherein:
the gate further includes a section locking tab that is movable between a section locked position and a section unlocked position;
when the section locking tab is in the section locked position, the section locking tab locks the upper section of the gate in the closed section position; and
when the section locking tab is in the section unlocked position, the section locking tab permits the upper section of the gate to move from the closed section position to the open section position.

21. The gestation stall gate assembly of claim 20 wherein:
the gate further includes a section bracket and a section positioning protrusion, the section bracket including a pivot recess, a closed section positioning recess, and an open section positioning recess, the section positioning protrusion being receivable in either one of the closed section positioning recess and the open section positioning recess;
the upper section of the gate includes an upper pivot shaft that is supported in the pivot recess of the section bracket;
moving the section locking tab to the section unlocked position while the upper section of the gate is in the closed section position enables the upper section to be raised upward to remove the section positioning protrusion from the closed section positioning recess of the section bracket; and
rotating the upper section of the gate from the closed section position to the open section position enables the section positioning protrusion to be received in the open section positioning recess, which holds the upper section in the open section position.

22. A gestation stall gate assembly comprising:
a gate support including a sleeve;
a gate coupled to the gate support and pivotable between an inwardly open gate position, an outwardly open gate position, and a closed gate position;
a locking bar having an upper end, a lower end, and a latching surface positioned between the upper and lower ends;
a latch pivotably coupled to the gate support and biased into engagement with the latching surface of the locking bar to stop downward movement of the locking bar through the sleeve; and
a rotating control bracket coupled to the gate for rotation therewith, the rotating control bracket having a bar reset cam surface and an unlatching surface,
wherein as the gate pivots toward the inwardly open gate position, the unlatching surface of the rotating control bracket is engageable with the latch to disengage the latch from the locking bar, and
wherein as the gate pivots toward the outwardly open gate position, the lower end of the locking bar is engageable with the bar reset cam surface and slidable along the bar reset cam surface to raise the latching surface of the locking bar to a latching height at which the latch is engageable with the latching surface to stop downward movement of the locking bar through the sleeve;
a control rod coupled to the gate support and rotatable about a central longitudinal axis of the control rod,
a line that couples the locking bar to the control rod to limit downward movement of the locking bar;
a coupling coupled to the control rod and configured to couple the line to the control rod;
a spring included in the line, the spring allowing temporary extension of the length of the line;

a control arm coupled to the control rod and moveable to rotate the control rod about the central longitudinal axis thereof; and an arm bracket coupled to the gate support, the arm bracket having a plurality of recesses for receiving and retaining the control arm in one of a plurality of positions to adjust the height of the coupling, wherein the plurality of recesses include a middle position recess, an upper position recess, and a lower position recess, the middle position recess corresponding to the first coupling being positioned at a middle height, the upper position recess corresponding to the first coupling being positioned at an upper height that is higher than the middle height, the lower position recess corresponding to the first coupling being positioned at a lower height that is lower than the middle height.

23. The gestation stall gate assembly of claim 22 wherein:
the latch is biased toward a latched position in which the latch engages the latching surface of the locking bar to prevent the locking bar from moving downward;
the rotating control bracket has a rotating recess; and
as the gate pivots toward the inwardly open gate position, the unlatching surface of the rotating control bracket engages the latch and thereby moves the latch from the latched position to an unlatched position in which the locking bar is allowed to move downwardly into the rotating recess of the rotating control bracket.

24. The gestation stall gate assembly of claim 22 wherein:
the gate support further includes a non-rotating control bracket having a non-rotating recess; and
when the control arm is positioned in one of the plurality of recesses and the gate returns to the closed gate position from the inwardly open gate position, the line permits the lower end of the locking bar to move downwardly through the rotating recess of the rotating control bracket and into the non-rotating recess of the non-rotating control bracket.

25. The gestation stall gate assembly of claim 1 wherein the control arm is rotatable about the central longitudinal axis of the control rod.

26. The gestation stall gate assembly of claim 15 wherein the non-rotating recess of the non-rotating control bracket is positioned directly below the rotating recess of the rotating control bracket when the gate is in its closed gate position.

27. The gestation stall gate assembly of claim 16 wherein the second coupling is coupled to the control rod independent of the first coupling.

28. The gestation stall gate assembly of claim 16 wherein the second coupling is coupled directly to the control rod.

* * * * *